US012536151B2

(12) United States Patent
Dhurandhar et al.

(10) Patent No.: US 12,536,151 B2
(45) Date of Patent: Jan. 27, 2026

(54) ACCURATE AND QUERY-EFFICIENT MODEL AGNOSTIC EXPLANATIONS

(71) Applicant: International Business Machines Corporation, Armonk, NY (US)

(72) Inventors: Amit Dhurandhar, Yorktown Heights, NY (US); Karthikeyan Natesan Ramamurthy, Pleasantville, NY (US); Karthikeyan Shanmugam, Bengaluru (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 4 days.

(21) Appl. No.: 18/057,776

(22) Filed: Nov. 22, 2022

(65) Prior Publication Data
US 2024/0168940 A1    May 23, 2024

(51) Int. Cl.
*G06F 16/23* (2019.01)
*G06F 16/2453* (2019.01)

(52) U.S. Cl.
CPC ...... *G06F 16/2365* (2019.01); *G06F 16/2453* (2019.01)

(58) Field of Classification Search
None
See application file for complete search history.

(56) References Cited

U.S. PATENT DOCUMENTS 11,049,043 B2    6/2021 Dalli et al.
11,556,746 B1*  1/2023 Dasgupta ............ G06N 5/04
2014/0372351 A1* 12/2014 Sun ............... G06Q 10/063
                                                     706/12
2018/0300792 A1* 10/2018 Dhurandhar ...... G06Q 30/0631
2020/0167641 A1*  5/2020 Dhurandhar ........... G06N 3/045
(Continued)

FOREIGN PATENT DOCUMENTS

CN    108197028 B    12/2020

OTHER PUBLICATIONS

C. J. Anders, P. Pasliev, A.-K. Dombrowski, K.-R. Muller, and P. Kessel. Fairwashing explanations with off-manifold detergent. In Intl. Conference on Machine Learning (ICML), 2020.
(Continued)

*Primary Examiner* — Giuseppi Giuliani
(74) *Attorney, Agent, or Firm* — Amin, Turocy & Watson, LLP

(57) ABSTRACT

One or more systems, devices, computer program products and/or computer-implemented methods of use provided herein relate to a process for providing an explanation result for an analytical model. A system can comprise a memory that stores computer executable components, and a processor that executes the computer executable components stored in the memory, wherein the computer executable components can comprise an uncertainty component that determines an uncertainty score for a distribution of samples that neighbor a selected input to an analytical model, a sampling component that identifies a subset of the distribution of samples based on the uncertainty score, and an explanation component that generates an explanation of an output of the analytical model, corresponding to the selected input, based on use of a sample from the subset of the distribution of samples.

20 Claims, 10 Drawing Sheets

(56) References Cited

U.S. PATENT DOCUMENTS

| | | | |
|---|---|---|---|
| 2020/0184350 A1* | 6/2020 | Bhide | G06N 5/04 |
| 2020/0193243 A1* | 6/2020 | Dhurandhar | G06N 3/04 |
| 2021/0049503 A1 | 2/2021 | Nourian et al. | |
| 2021/0056355 A1* | 2/2021 | Luss | G06N 3/045 |
| 2021/0133610 A1 | 5/2021 | Natesan Ramamurthy et al. | |
| 2021/0358478 A1 | 11/2021 | Aggarwal et al. | |
| 2022/0245502 A1 | 8/2022 | Sahagian et al. | |
| 2022/0261400 A1* | 8/2022 | Pushak | G06F 16/2465 |
| 2022/0327352 A1 | 10/2022 | Dey et al. | |
| 2023/0133868 A1* | 5/2023 | Todoriki | G06N 20/10 706/12 |
| 2023/0196109 A1* | 6/2023 | Todoriki | G06N 5/045 706/25 |
| 2023/0196129 A1* | 6/2023 | Shingu | G06N 7/01 706/59 |
| 2023/0206128 A1* | 6/2023 | Ishizaki | G06N 5/045 706/12 |

OTHER PUBLICATIONS

T. Botari, F. Hvilshøj, R. Izbicki, and A. C. P. L. F. de Carvalho. Melime: Meaningful local explanation for machine learning models, 2020.
G. Casella, C. P. Robert, and M. T.Wells. Generalized accept-reject sampling schemes. Institute of Mathematical Statistics, 2004.
D. Dheeru and E. Karra Taniskidou. UCI machine learning repository, 2017.
A. Dhurandhar, T. Pedapati, A. Balakrishnan, K. A. Pin-Yu Chen, Karthikeyan Shanmugam, and R. Puri. Model agnostic contrastive explanations for structured data. https://arxiv.org/abs/1906.00117, 2019.
A. Dhurandhar, K. Ramamurthy, K. Ahuja, and V. Arya. Locally invariant explanations: Towards stable and unidirectional explanations through local invariant learning. arXiv:2201.12143, 2022.
I. Diakonikolas, J. Li, and A. Voloshinov. Efficient algorithms for multidimensional segmented regression. arXiv:2003.11086, 2020.
FICO. Explainable machine learning challenge. https://community.fico.com/s/explainable-machine-learning-challenge?tabset-3158a=2, 2018. Accessed: Oct. 25, 2018.
E. Frank, Y. Wang, S. Inglis, G. Holmes, and I. H. Witten. Using model trees for classification. Machine Learning, 1998.
C. Frye, C. Rowat, and I. Feige. Asymmetric shapley values: incorporating causal knowledge into model-agnostic explainability. NeurIPS, 2020.
M. Garofalakis, D. Hyun, R. Rastogi, and K. Shim. Efficient algorithms for constructing decision trees with constraints. In Proceedings of the Sixth ACM SIGKDD International Conference on Knowledge Discovery and Data Mining, KDD '00, p. 335-339. Association for Computing Machinery, 2000.
A. Ghorbani, A. Abid, and J. Zou. Interpretation of neural networks is fragile, 2019.
D. Gunning. Explainable artificial intelligence (xai). In Defense Advanced Research Projects Agency, 2017.
K. Gurumoorthy, A. Dhurandhar, G. Cecchi, and C. Aggarwal. Efficient data representation by selecting prototypes with importance weights. In Proceedings of the IEEE International Conference on Data Mining, 2019.
L. Hancox-Li. Robustness in machine learning explanations: does it matter? In Proceedings of the 2020 Conference on Fairness, Accountability, and Transparency. ACM, 2020.
M. Herlihy and N. Shavit. The art of multiprocessor programming. Elsevier, 2012.
T. Heskes, E. Sijben, I. G. Bucur, and T. Claassen. Causal shapley values: Exploiting causal knowledge to explain individual predictions of complex models. Advances in Neural Information Processing Systems, 2020.
A. Ilyas, L. Engstrom, A. Athalye, and J. Lin. Black-box adversarial attacks with limited queries and information. Intl. Conference on Machine Learning, 2018.
A. Krizhevsky. Learning multiple layers of features from tiny images, 2009.
Z. Lu, H. Pu, F. Wang, Z. Hu, and L. Wang. The expressive power of neural networks: A view from the width. Advances in Neural Inf. Proc. Systems, 2017.
S. M. Lundberg and S.-I. Lee. A unified approach to interpreting model predictions. In Advances in Neural Information Processing Systems, pp. 4765-4774, 2017.
J. Pearl. Causality: Models, Reasoning, and Inference. Cambridge University Press, 2000.
T. Pedapati, A. Balakrishnan, K. Shanmugam, and A. Dhurandhar. Learning global transparent models consistent with local contrastive explanations. Advances in Neural Inf. Proc. Systems, 2020.
G. Plumb, D. Molitor, and A. Talwalkar. Model agnostic supervised local explanations. In Advances in Neural Information Processing Systems, p. 2520-2529, 2018.
K. N. Ramamurthy, B. Vinzamuri, Y. Zhang, and A. Dhurandhar. Model agnostic multilevel explanations, 2020.
M. T. Ribeiro, S. Singh, and C. Guestrin. "Why should I trust you?": Explaining the predictions of any classifier. In Proceedings of the ACM SIGKDD International Conference on Knowledge Discovery and Data Mining, pp. 1135-1144, 2016.
H. Shah, K. Tamuly, A. Raghunathan, P. Jain, and P. Netrapalli. The pitfalls of simplicity bias in neural networks. Advances in Neural Information Processing Systems, 33:9573-9585, 2020.
A. A. Shrotri, N. Narodytska, A. Ignatiev, J. Marques-Silva, K. S. Meel, and M. Vardi. Constraint-driven explanations of black-box {ml} models, 2021.
M. K. Vijaymeena and K. Kavitha. A survey on similarity measures in text mining. Machine Learning and Applications, 2016.
P. N. Yannella and O. Kagan. Analysis: Article 29 working party guidelines on automated decision making under gdpr. 2018. https://www.cyberadviserblog.com/2018/01/analysis-article-29-working-party-guidelines-on-automated-decision-making-under-gdpr/.
Y. Zhang, K. Song, Y. Sun, S. Tan, and M. Udell. Why should you trust my explanation? ICML-AI for Social Good, 2019.
X. Zhao, W. Huang, X. Huang, V. Robu, and D. Flynn. Baylime: Bayesian local interpretable model-agnostic explanations. UAI, 2021.

* cited by examiner

ACCURATE AND QUERY-EFFICIENT MODEL AGNOSTIC EXPLANATIONS

TECHNICAL FIELD

The present disclosure relates to ascertaining explanations for decisions of closed box analytical models and more particularly to determination of neighboring sample distribution to inputs of such closed box analytical models with which to ascertain such explanations.

BACKGROUND

Existing frameworks have attempted to ascertain explanations for decisions of closed box models on a selected input by perturbing the input or by sampling around the input, creating a distribution neighborhood of samples, and then fitting a sparse model to that distribution. However, these methods are unfaithful in that the sparse model built does not closely replicate the behavior of the closed box model, and thus has low infidelity. Additionally, and/or alternatively, such methods are unstable, such that for different distribution widths, along a graph of outputs of the closed box model, similar quality explanations are not recovered based on the sparse models built, leading to high variation in infidelity and high coefficient inconsistency.

SUMMARY

The following presents a summary to provide a basic understanding of one or more embodiments described herein. This summary is not intended to identify key or critical elements, and/or to delineate scope of particular embodiments or scope of claims. Its sole purpose is to present concepts in a simplified form as a prelude to the more detailed description that is presented later. In one or more embodiments described herein, systems, computer-implemented methods, apparatuses and/or computer program products can provide a process to provide an explanation result for an analytical model.

In accordance with an embodiment, a system can comprise a memory that stores computer executable components, and a processor that executes the computer executable components stored in the memory, wherein the computer executable components can comprise an uncertainty component that determines an uncertainty score for a distribution of samples that neighbor a selected input to an analytical model, a sampling component that identifies a subset of the distribution of samples based on the uncertainty score, and an explanation component that generates an explanation of an output of the analytical model, corresponding to the selected input, based on use of a sample from the subset of the distribution of samples.

In accordance with another embodiment, a computer-implemented method can comprise determining, by a system operatively coupled to a processor, an uncertainty score for a distribution of samples that neighbor a selected input to an analytical model, identifying, by the system, a subset of the distribution of samples based on the uncertainty score, and generating, by the system, an explanation of an output of the analytical model, corresponding to the selected input, based on use of a sample from the subset of the distribution of samples.

In accordance with yet another embodiment, a computer program product for providing an explanation result for an analytical model can comprise a computer readable storage medium having program instructions embodied therewith, the program instructions executable by a processor to cause the processor to determine, by the processor, an uncertainty score for a distribution of samples that neighbor a selected input to an analytical model, identify, by the processor, a subset of the distribution of samples based on the uncertainty score, and generate, by the processor, an explanation of an output of the analytical model, corresponding to the selected input, based on use of a sample from the subset of the distribution of samples.

As used herein, an uncertainty score can be an estimation of the viability of a determined distribution of samples around a selected input to an analytical model, where the viability can relate to whether such distribution accurately represents a local piece of the analytical model and/or local piece of output results of the analytical model. That is, because analytical models can be overly complex and thus can be represented by a plurality of linear and/or polynomial pieces, such distribution of samples is desired to be localized to a single piece of such plurality of linear and/or polynomial pieces to avoid unfaithfulness and/or instability in an interpretable, local model derived from such distribution of samples.

As used herein, "local" can refer to adjacency and/or neighboring to. For example, a distribution of samples can be localized about a selected input to an analytical model. For another example, a piece of a set of outputs of an analytical model can be local relative to an output of the closed box analytical model to the selected input (e.g., such as without comprising one or more portions of adjacent pieces).

As described above, faithfulness can refer to how closely an interpretable, local model (e.g., built to replicate the behavior of the analytical model) actually replicates local behavior of the analytical model relative to a selected input/corresponding output to the analytical model. High faithfulness can correspond to low infidelity.

Also as described above, stability can refer to that, for different distribution widths, along a graph of outputs of the analytical model, similar quality explanations are desired to be recovered from such interpretable, local model. High stability can correspond to low variation in infidelity and low coefficient inconsistency.

As used herein infidelity can refer to a mean absolute error (MAE) between an explanation and an analytical model over the sample set employed to determine the explanation.

As used herein coefficient inconsistency can refer to the MAE between the attributions of the samples of the sample set and their neighbors. Attributions can refer to explanations or feature importances obtained from the proxy model.

As used herein, an analytical model can comprise and/or can be comprised by a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, self-supervised, semi-supervised and/or unsupervised. The analytical model can be a closed box model such that interpretability of results is not provided, explainability of results is not provided and/or access to inner workings of such closed box model is not provided and/or is not possible due to the nature of such closed box model.

Finally, as used herein, an explanation of an analytical model (e.g., closed box model) can refer to one or more reasons for why a particular output is provided by the analytical model in view of a selected input to the analytical model. For example, an input of health data for an entity can result in an output of a diagnosis of a medical condition, without providing any corresponding reason at to what one or more aspects of the health data led to and/or caused such output diagnosis.

An advantage of the above-indicated system, method and/or computer program product can be obtaining reliable post-hoc explanations to allow for relatability of an output of an analytical model to one or more aspects of a selected input to the analytical model to which the output corresponds. The explanations can be reliable because they can closely correspond to behavior of the analytical model. Additionally, and/or alternatively, the explanations can be reliable because varying distribution sample sizes (e.g., widths/radiuses) about a selected input can result in low variation in such explanations.

Another advantage of the above-indicated system, method and/or computer program product can be imbibing trust in such analytical model based on a reliable post-hoc explanation for an output of the analytical model. Such advantage can be relative to a plurality of domains where analytical models are often employed, such as, but not limited to finance (e.g., credit approval), health care (e.g., medical treatment decisions and/or medical diagnoses), criminal justice (e.g., criminal risk assessment), and/or agriculture (e.g., predicting crop yield and/or nutrient input).

In one or more embodiments of the aforementioned system, method and/or computer program product, such system, method and/or computer program product can be agnostic relative to type and/or complexity of analytical model being evaluated. That is, varying degrees of complexity of analytical models can be evaluated by the one or more embodiments disclosed herein with similar results. Varying types of analytical models (e.g., artificial intelligence, deep learning, machine learning, etc.) can be evaluated by the one or more embodiments disclosed herein with similar results.

DETAILED DESCRIPTION

Figure 1:
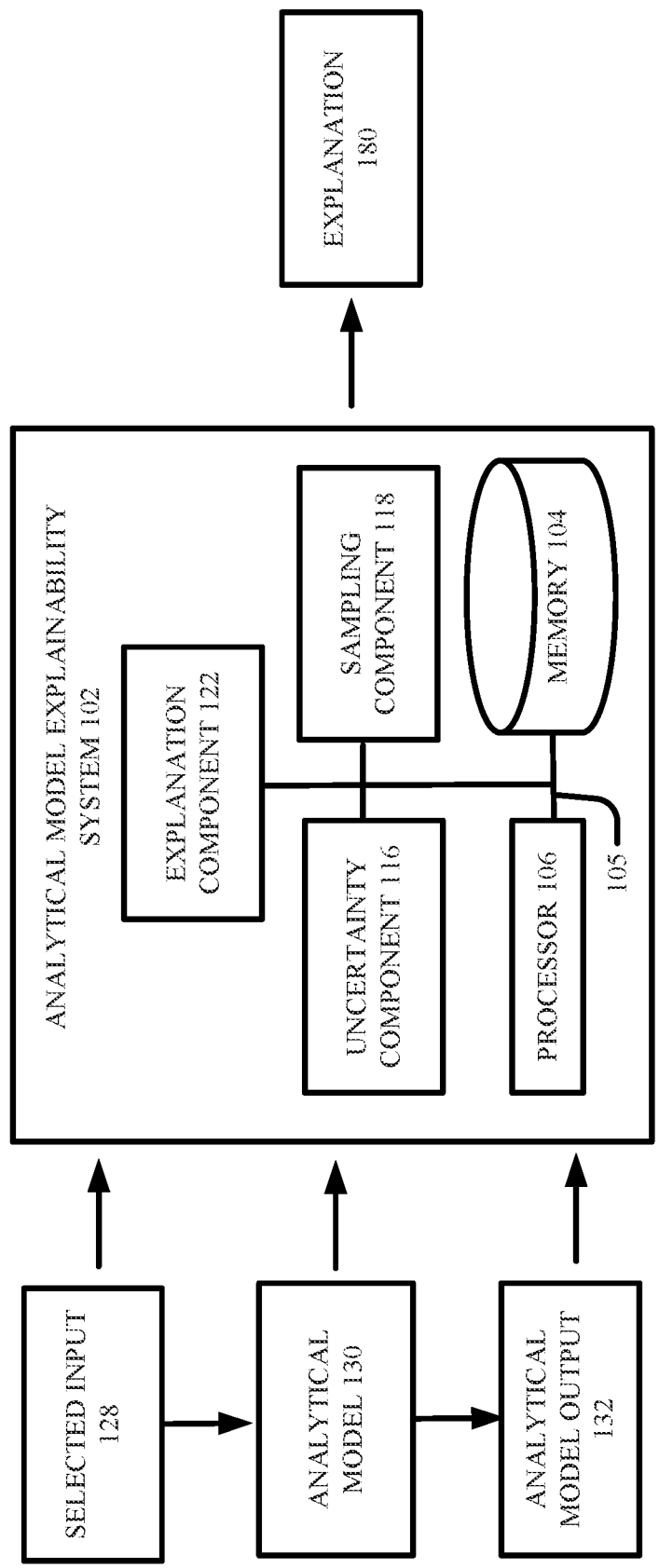
FIG. 1 illustrates a block diagram of an example, non-limiting system that can provide an explanation result for an analytical model, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Relative to analytical models that are usually, if not always, closed box methods (e.g., not providing interpretability and/or explainability for results provided), explanations can often be desired for local interpretation pieces (e.g., portions of) the analytical model corresponding to one or more selected inputs (e.g., known inputs) to the analytical model. Yet, provision of such explanations can be substantially more challenging than provision of a global explanation relative to the entire analytical model, which often is not narrow enough to provide accurate and/or precise explanation relative to one or more selected inputs to the analytical model.

Existing models than attempt to provide a local explanation for an analytical model generally employ some type of sampling or perturbation scheme to estimate a simple interpretable model (e.g., a sparse linear model), that can be then read off to ascertain an explanation. However, because of inherent randomness of such procedures, the right local interpretable model often is not generated, and thus the explanation can be partially and/or fully invalid and/or unrelated to a selected input to the analytical model for which the explanation is desired.

As indicated above, existing frameworks for addressing such explainability fail in that explainability results provided are neither stable nor faithful. That is, the explanations do not closely correspond to the behavior of the analytical model and/or various distribution widths (which also can include radiuses) do not result in similar explanations and/or quality of explanations (e.g., explanation inconsistency).

Likewise, it is noted that simply using small kernel widths, as in existing approaches, which can correspond to considering only extremely close samples in a sparse linear estimation, can lead to instability (e.g., high infidelity).

In view of existing frameworks deficiencies in both stability and faithfulness, the inventors of the present disclosure have determined that a unique problem to overcome is that of whether the distribution being employed for secondary, interpretable models based on local portions of such closed box models are even accurate. That is, it has been discovered that the local boundaries about example inputs to a closed box model are not approximated well in existing frameworks. Put another way, local boundaries for sample distribution about a selected input of a closed box model, for existing frameworks, are not faithful to true behavior of the respective closed box model around such selected input, given that the closed box model can be highly non-linear, such as having a plurality of linear, but connected, pieces.

Indeed, it can be difficult to know the correct neighborhood width (or radius) of the distribution. This difficulty can lead to failure of the fittings of sparse models of existing frameworks because too small a width can lead to a bad condition number of the inverse covariance matrix of function fitting procedures resulting in unstable predictions, and too large a width can lead to accounting for multiple linear pieces and consequently a poor local approximation.

To account for these one or more deficiencies, disclosed herein is a framework that is robust across neighborhood widths in recovering faithful local explanations, and is at least partially based on uncertainty estimation of a distribution identified around a selected input of a closed box model. Provided is a naive implementation of the disclosed approach, due to typical inaccessibility to the inner workings of such closed box models, and which still provides accurate explanation results. The implementation at least partially comprises an adaptive neighborhood sampling scheme (ANS) that is both sample efficient and query efficient, while also being faithful and stable across different widths (x-axis), along a graph of outputs of a respective closed box model.

As used herein, query efficiency can refer to use of only a number of samples necessary, and thus querying an analytical model with only those samples necessary. That is, a high query efficiency can correspond to lower monetary cost, inference time, power consumption and/or network latency used and/or caused due to such querying.

As used herein, sample efficiency can refer to a measure of the usefulness of a sampling strategy. That is, a more efficient sampling strategy can be implemented with fewer simulations and less computational time to reach a certain level of accuracy.

Such one or more frameworks discussed herein can provide an explanation by adaptively sampling in an estimated local region where the analytical model is approximately linear (or polynomial), while still respecting the initial sampling process/distribution first used to determine that region.

The estimate of the relevant linear region can be done using fewer queries of the analytical model than a total query budget of the analytical model, yet can result in more samples in the desired region, thus minimizing query wastage compared with simply querying the analytical model multiple times, such as equal to the total query budget. Based on the limited queries, the relevant linear region can be determined, and a local sparse model (e.g., linear model) can be fitted and used to provide the desired explanation. These processes can be directly related to the aforementioned query efficiency of one or more embodiments described herein. As noted above, query efficiency can lead to lower monetary cost, inference time, power consumption and/or network latency that can be associated with each query to an analytical model.

Turning now to a general summary of operations, prior to delving into additional details, one or more frameworks disclosed herein can perform one or more operations for outputting an explanation for an output of an analytical model (e.g., a closed box model) from a selected (e.g., known) input to the analytical model. The one or more operations can comprise, but are not limited to, determining an initial realistic neighborhood of samples about a selected input to an analytical model, where the samples can comprise additional inputs to the analytical model, and running a mathematical model to approximate a region (e.g., distribution of samples) that can be used to explain an output of the analytical model to the selected input. The region can comprise one or more samples from the initial realistic neighborhood of samples. The one or more operations further can comprise, but are not limited to, estimating an uncertainty score defining a confidence in the region approximated, and using the uncertainty score to fit a regression model to a subset of samples within the region. Samples of the subset of samples will comprise samples of the distribution of samples and can comprise one or more samples from the initial realistic neighborhood of samples. The one or more operations further can comprise, but are not limited to, employing a local model output as a result of the fitting by querying the local model with the subset of samples, and determining, based on one or more results of the querying, an explanation of the output from the analytical model corresponding to the selected input.

As used herein, the term "cost" can refer to money, power, memory, bandwidth, time and/or manual labor.

As used herein, the terms "entity," "requesting entity," and "user entity" can refer to a machine, device, component, hardware, software, smart device and/or human.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in one or more cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100 and/or 200 illustrated at FIGS. 1 and 2, and/or systems thereof, can further comprise one or more computer and/or computing-based elements described herein with reference to a computing environment, such as the computing environment 1000 illustrated at FIG. 10. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning now in particular to one or more figures, and first to FIG. 1, the figure illustrates a block diagram of an example, non-limiting system 100 that can facilitate a process for providing an explanation result for an analytical model, in accordance with one or more embodiments described herein.

The non-limiting system 100 can comprise an analytical model explainability system 102, which can be associated with a cloud computing environment. The analytical model explainability system 102 can comprise one or more components, such as a memory 104, processor 106, bus 105, uncertainty component 116, sampling component 118 and/or explanation component 122. Generally, the analytical model explainability system 102, and thus non-limiting system 100, can facilitate evaluation of a selected input 128 for which understanding is desired to be obtained. That is, the selected input 128 can be an input to an analytical model 130 corresponding to an analytical model output 132 of the analytical model 130. Yet such output 132 can be unexplained relative to the selected input 128, and thus an explanation can be desired. It is noted that data of the selected input 128 can comprise metadata and can be provided in any suitable format.

The analytical model explainability system 102 can provide the explanation absent access and/or incursion into data of the analytical model 130 itself, which can be inaccessible. The analytical model 130 can be accessed by any suitable method by the analytical model explainability system 102, such as a local network, internet and/or cloud.

The uncertainty component 116 can determine an uncertainty score for a distribution of samples that neighbor the selected input 128 to the analytical model 130. The sampling component 118 can, in turn, identify a subset of the distribution of samples based on the uncertainty score. Further, the explanation component 122 can generate, based on use of one or more samples from the subset of the distribution samples, an explanation of an output of the analytical model. As a result, the unexplainable analytical model 130 can be at least locally explained (locally relative to the selected input 128) in both a query efficient and sampling efficient manner.

Figure 2:
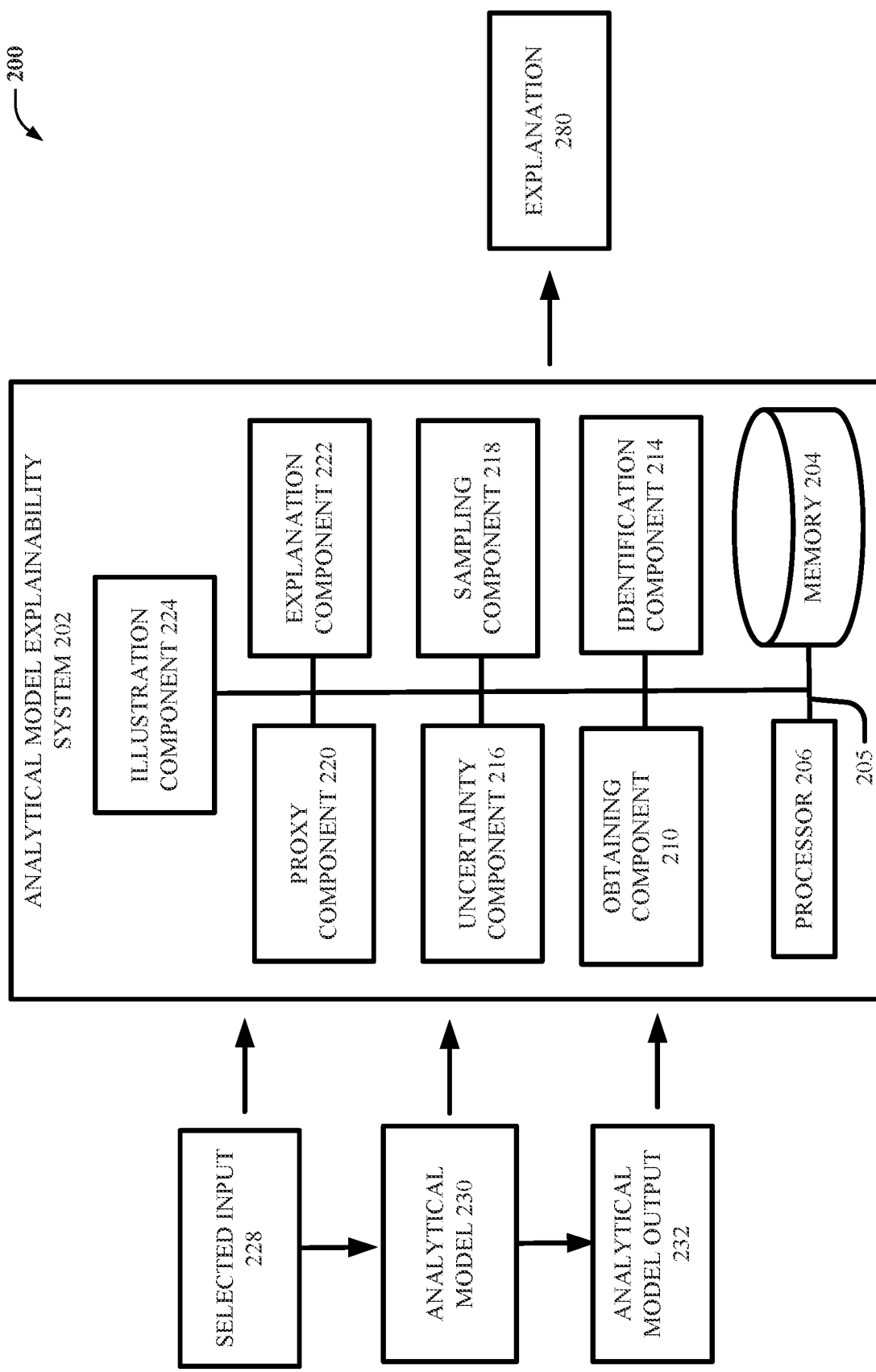
FIG. 2 illustrates a block diagram of another example, non-limiting system that can provide an explanation result for an analytical model, in accordance with one or more embodiments described herein.

Turning next to FIG. 2, a non-limiting system 200 is illustrated that can comprise an analytical model explainability system 202. Repetitive description of like elements and/or processes employed in respective embodiments is omitted for sake of brevity. Description relative to an embodiment of FIG. 1 can be applicable to an embodiment of FIG. 2. Likewise, description relative to an embodiment of FIG. 2 can be applicable to an embodiment of FIG. 1.

One or more communications between one or more components of the non-limiting system 200 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The analytical model explainability system 202 can be associated with, such as accessible via, a cloud computing environment.

The analytical model explainability system 202 can comprise a plurality of components. The components can comprise a memory 204, processor 206, bus 205, obtaining component 210, identification component 214, uncertainty component 216, sampling component 218, proxy component 220, explanation component 222 and/or illustration component 224.

Generally, analytical model explainability system 202, and thus non-limiting system 200, can facilitate evaluation of a selected input 228 to providing an explanation result for the analytical model 230 (e.g., for an analytical model output 232 of the analytical model 230, which output 232 corresponds to input of the selected input 228 to the analytical model 230). The analytical model explainability system 202 can provide the explanation absent access and/or incursion into data of the analytical model 230 itself, which can be inaccessible.

The analytical model 230 can be accessed by any suitable method by the analytical model explainability system 202, such as a local network, internet and/or cloud.

Data of the selected input 228 can comprise metadata and can be provided in any suitable format.

Discussion first turns briefly to the processor 206, memory 204 and bus 205 of the analytical model explainability system 202. For example, in one or more embodiments, the analytical model explainability system 202 can comprise the processor 206 (e.g., computer processing unit, microprocessor, classical processor, quantum processor and/or like processor). In one or more embodiments, a component associated with analytical model explainability system 202, as described herein with or without reference to the one or more figures of the one or more embodiments, can comprise one or more computer and/or machine readable, writable and/or executable components and/or instructions that can be executed by processor 206 to provide performance of one or more processes defined by such component and/or instruction. In one or more embodiments, the processor 206 can comprise the obtaining component 210, identification component 214, uncertainty component 216, sampling component 218, proxy component 220, explanation component 222 and/or illustration component 224.

In one or more embodiments, the analytical model explainability system 202 can comprise the computer-readable memory 204 that can be operably connected to the processor 206. The memory 204 can store computer-executable instructions that, upon execution by the processor 206, can cause the processor 206 and/or one or more other components of the analytical model explainability system 202 (e.g., obtaining component 210, identification component 214, uncertainty component 216, sampling component 218, proxy component 220, explanation component 222 and/or illustration component 224) to perform one or more actions. In one or more embodiments, the memory 204 can store computer-executable components (e.g., obtaining component 210, identification component 214, uncertainty component 216, sampling component 218, proxy component 220, explanation component 222 and/or illustration component 224).

The analytical model explainability system 202 and/or a component thereof as described herein, can be communicatively, electrically, operatively, optically and/or otherwise coupled to one another via a bus 205. Bus 205 can comprise one or more of a memory bus, memory controller, peripheral bus, external bus, local bus, quantum bus and/or another type of bus that can employ one or more bus architectures. One or more of these examples of bus 205 can be employed.

In one or more embodiments, the analytical model explainability system 202 can be coupled (e.g., communicatively, electrically, operatively, optically and/or like function) to one or more external systems (e.g., a non-illustrated electrical output production system, one or more output targets and/or an output target controller), sources and/or devices (e.g., classical and/or quantum computing devices, communication devices and/or like devices), such as via a network. In one or more embodiments, one or more of the components of the analytical model explainability system 202 and/or of the non-limiting system 200 can reside in the cloud, and/or can reside locally in a local computing environment (e.g., at a specified location).

In addition to the processor 206 and/or memory 204 described above, the analytical model explainability system 202 can comprise one or more computer and/or machine readable, writable and/or executable components and/or instructions that, when executed by processor 206, can provide performance of one or more operations defined by such component and/or instruction.

Figure 3:
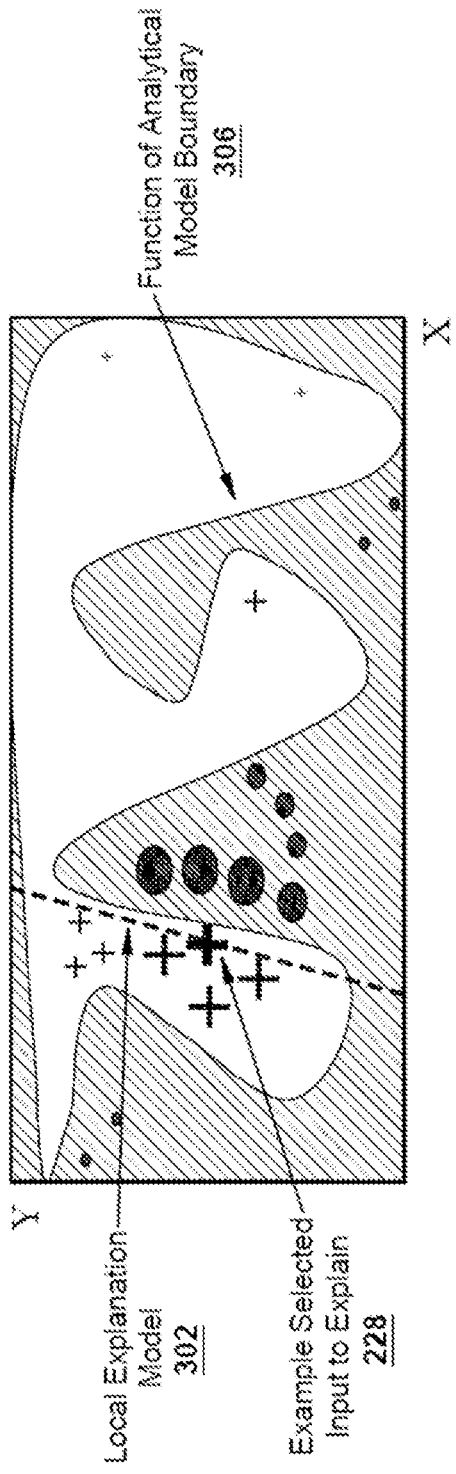
FIG. 3 illustrates an illustration of an analytical model for which the non-limiting system of FIG. 2 can provide an explanation result, in accordance with one or more embodiments described herein.

Description turns next briefly to FIG. 3 to set forth a general illustrated explanation of processes that can be performed by the analytical model explainability system 202. Illustrated is an analytical model illustration graph 300, such as of the analytical model 230. The selected input 228 is labeled, relative to a function of analytical model boundary 306 (e.g., of the function of the analytical model 230). As shown, the boundary 306 is not linear, and has various shapes and pieces. Relative to determining a width of samples along the illustrated x-axis, even a small width of samples can result in selection of samples relating to and/or comprised by multiple pieces of the graph 300, and thus having different outputs and explanations related thereto. Accordingly, it is desirable to estimate a distribution of samples that are local (e.g., close to/neighboring) the selected input 228. For example, it can be desired to estimate a local explanation model such as the linear local explanation model 302 illustrated at the graph 300. As shown, this local explanation model 302 can be limited to a single piece of the closed box decision boundary 306, based on one or more processes that can be performed by the analytical model explainability system 202.

Figure 4:
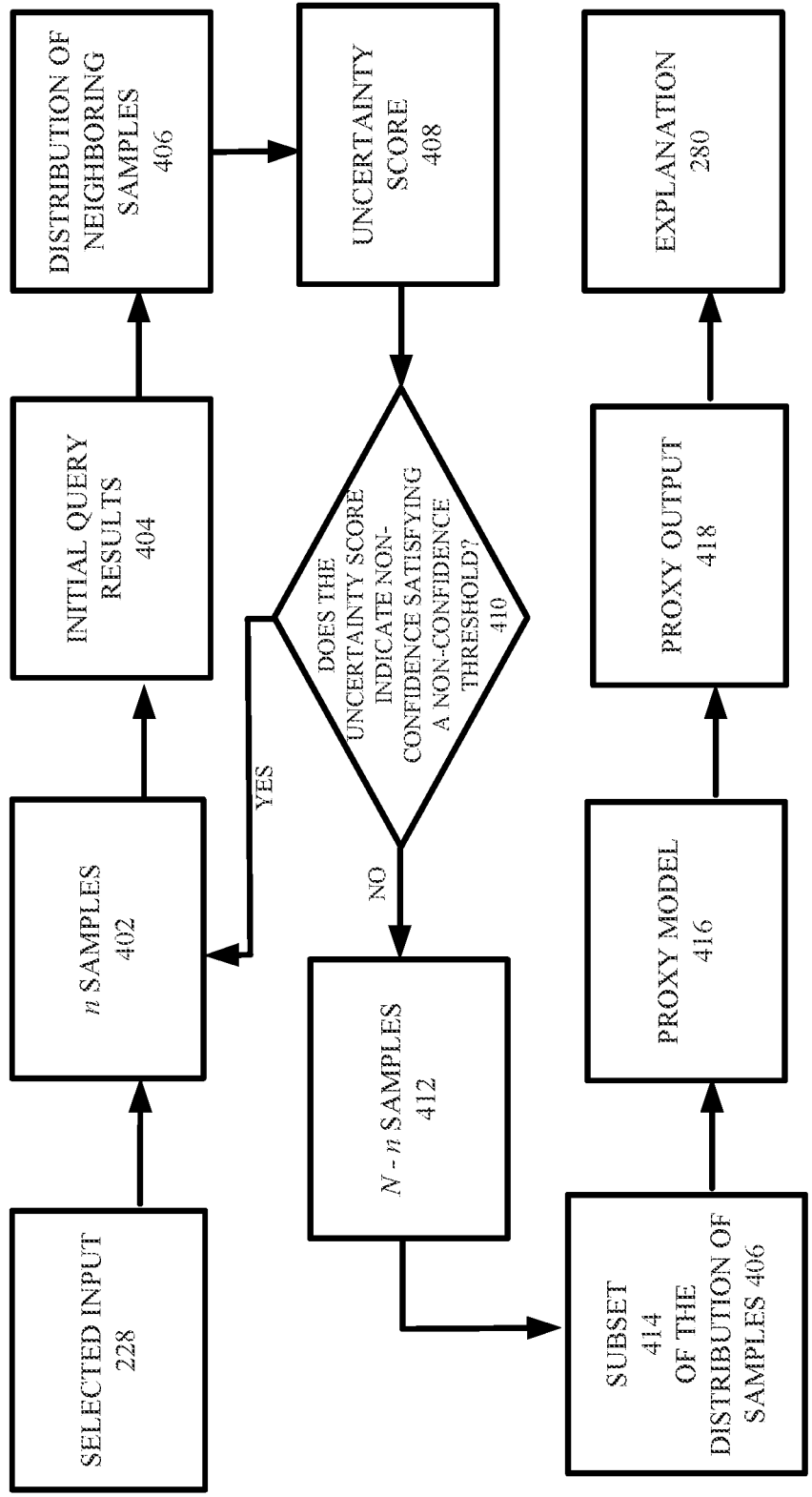
FIG. 4 illustrates a flow diagram of a set of operations performed by the non-limiting system of FIG. 2, in accordance with one or more embodiments described herein.

Description turns next briefly to FIG. 4 and to an explanation process diagram 400 to set forth a high-level set of ordered inputs and outputs that can be obtained and/or used by the obtaining component 210, identification component 214, uncertainty component 216, sampling component 218, proxy component 220 and explanation component 222 of the analytical model explainability system 202. For example, the selected input 228 can be obtained by the obtaining component 210 and used by the identification component 214, along with the n samples 402 to obtain initial query results 404 based on querying of the analytical model 230 with the n samples 402. Based on the results of the querying, and through use of a regression model, such as a multidimensional piecewise segmented regression (MPSR), the identification component can determine a distribution of samples 406 neighboring the selected input 228. Using the distribution of samples 406 (e.g., a subset of the distribution of samples 406) the uncertainty component 216 can determine an uncertainty score 408.

Using a first subset of n samples of the distribution of samples 406, the uncertainty component 216 can make a determination (e.g., at step 410) as to whether the uncertainty score 408 indicates non-confidence satisfying a non-confidence threshold. Where the answer is yes, the respective explanation process can return to the identification component 214 for identifying a revised sample set $n_{rev}$ of samples neighboring the selected input 228, which sample set $n_{rev}$ can be larger than the initial set of n samples 402. Alternatively, where the answer is yes, the respective explanation process can still proceed, although the resultant explanation may include undesirable errors. Where the answer is no, the sampling component 218 can determine a subset 414 of the distribution of samples 406 based on the uncertainty score 408 and at least partially on the N-n samples 412.

That is, the subset 414 can employ an original sampling distribution mean of the distribution of samples 406 where the uncertainty score indicates very high confidence, employ a sampling distribution mean generally centered at the selected input 228 where the uncertainty score indicates very low confidence (or return to the identification component 214 for identifying a larger sample size $n_{rev}$), or employ a modified sampling distribution mean (e.g., between the original sampling distribution mean and a sampling distribution mean centered at the selected input 228). It is noted that the movement of a sampling distribution mean can refer to movement along a respective x-axis of an adaptive neighborhood sampling graph of the analytical model 230.

Based on the subset 414, the proxy component 220 can apply (e.g., fit) a regression model to the subset 414 to generate a proxy model 416 which can be a local estimation model for estimating a local piece of the analytical model 230 for the selected input 228. This proxy model 416 can be interpretable and in one or more embodiments, can be a linear model. For example, a lasso can be employed to generate the proxy model 416. Using one or more of the samples of the subset 414 as queries to the proxy model 416, the proxy component 220 can output a proxy output 418, which proxy output 418 can be employed by the explanation component 222 to determine one or more explanations 280 for how the analytical model output 232 from the analytical model 230 relates to the selected input 228.

Accordingly, turning now to the additional components of the analytical model explainability system 202. e.g., obtaining component 210, identification component 214, uncertainty component 216, sampling component 218, proxy component 220, explanation component 222 and/or illustration component 224, generally, the analytical model explainability system 202 can, as indicated above, employ one or more, such as each, of these components to facilitate a process for providing an explanation result for the analytical model 230.

Turning first to the obtaining component 210, the obtaining component 210 can identify, search, receive, transfer and/or otherwise obtain the analytical model 230 and selected input 228. The analytical model 230 can be stored at any suitable location accessible by the analytical model explanation system 202. The selected input 228 can have any suitable format. An exemplary selected input 228 can comprise numerical and/or text data, such as financial statistics and/or health statistics relative to a respective financial domain analytical model 230 or healthcare domain analytical model 230. In one or more embodiments, the obtaining component 210 likewise can obtain an analytical model output 232, having already been output and/or or requested (e.g., by the obtaining component 210), that corresponds to the selected input 228. Like the selected input 228, the analytical model output 232 can have any suitable format, whether text, code and/or numerical.

Next, the identification component 214, uncertainty component 216, sampling component 218 and proxy component 220 each can perform one or more steps of an adaptive neighborhood sampling (ANS) scheme. This ANS scheme, at a high level, takes the selected input 228 and a sent of n samples of a larger set of N samples from around the selected input 228 as inputs. As an output, the ANS scheme can provide a local interpretable model l(•) based on a local portion (e.g., a piece) of the analytical model 230. As another output, the ANS scheme can provide as set of k coefficients of the local interpretable model l(•), which can be employed by the explanation component 222 to generate one or more explanations relative to the selected input 228 and corresponding output 232 of the analytical model 230.

An example ANS scheme is provided below, where μ is a selected input 228, the analytical model 230 is f(•), the local interpretable model generated is l(•), n is the initial set of samples taken around μ. N is the maximum number of generated neighbors, α is the determined uncertainty, $a_n$ and $b_n$ are the initially determined boundaries for a distribution of samples to be used to generate the local interpretable model generated is l(•), $Q_1$ is a subset of the distribution of samples of a region $|a_n, b_n|$ on which uncertainty α can be based, $Q_2$ is a subset of the distribution of samples of a region $|a_n, b_n|$ that are based on uncertainty α and input to the local interpretable model generated is l(•) once generated, and σ is a standard deviation relative to μ. Also, ρ is an overlap coefficient, $\mathcal{N}$ denotes a normal or Gaussian distribution and I is the respective identity matrix. It is noted that neighbors can be generated by random and/or realistic perturbations of the selected input (e.g., selected input 228) desired to be explained.

Exemplary ANS Scheme:
Set Q=∅#Examples to query
Sample n(<<N) examples from $\mathcal{N}(\mu, \sigma^2 I)$ and query f(•)
Find region $[a_n, b_n]$ that corresponds to μ using MPLSR methods on the n samples
Add to Q samples that lie in $[a_n, b_n]$
Estimate uncertainty α #Could be set $$\propto \frac{1}{\sqrt{n}}$$

or based on stability of the region (i.e. 1–ρ)
Sample N-n examples from $$\mathcal{N}\left(\alpha\mu + (1-\alpha)\frac{a_n + b_n}{2}, \sigma^2 I\right)$$

Add to Q samples that lie in $[a_n, b_n]$
Query f(•) on these additional samples added to Q
Fit interpretable model (viz, sparse linear) l(•) to (x, f(x)) where x∈Q It is noted, as can be realized below, that $Q_1$ can comprise one or more samples from n, but that a region represented by $|a_n, b_n|$ is larger than a region represented by n, and smaller than or equal to a region represented by N. Likewise, $Q_2$ can comprise one or more samples from $Q_1$ and also can comprise one or more samples from n. Generally put, $Q_1$ can be based on n, and $Q_2$ can be based on $Q_1$.

The identification component 214 can generally identify an initial set of samples n neighboring a selected input 228 to an analytical model 230. For example, turning to FIG. 6, in addition to FIG. 2, a graph 600 illustrates a boundary 602 of the function of the analytical model 230. The boundary 602 can comprise a plurality of pieces (e.g., sections) such as a first piece 604, a second piece 606 and a third piece 608 that intersect one another. Example selected inputs $\mu_1$ and $\mu_2$ are illustrated as two example inputs to the analytical model 230. As shown, selected input $\mu_1$ is disposed at the second piece 606 and neighbors the first piece 604. Examples of samples n for $\mu_1$ can comprise $n_{1-1}$ and $n_{1-2}$. Also as shown, selected input $\mu_2$ is disposed at the second piece 606 and neighbors the third piece 608. Examples of samples n for $\mu_2$ can comprise $n_{2-1}$ and $n_{2-2}$.

Using the n samples (e.g., initial samples determined via random and/or realistic perturbation of the selected input 228/μ), the identification component 214 can query the analytical model 230 f(•) and obtain an initial set of outputs. Based on this initial set of outputs, the identification component 214 can identify the region $|a_n, b_n|$ that corresponds to a μ (e.g., $\mu_1$ or $\mu_2$) by using a multidimensional piecewise segmented regression (MPSR). As used herein, this region $|a_n, b_n|$ can be referred to as a distribution of samples. Although the exemplary ANS scheme indicates use of multidimensional piecewise linear segmented regression (MPLSR), this MPSR can be a MPLSR or a multidimensional piecewise polynomial segmented regression (MPPSR), for example. An MPPSR can be helpful, for example, where the boundaries of a function of an analytical model have high curvature.

Next, the uncertainty component 216 can identify a first $Q_1$ subset of the distribution of samples that lie within the region $|a_n, b_n|$. Based on this $Q_1$ subset of the distribution of samples, uncertainty component 216 can determine the uncertainty α for the region $|a_n, b_n|$ (e.g., for the distribution of samples output by the identification component 214).

Figure 5:
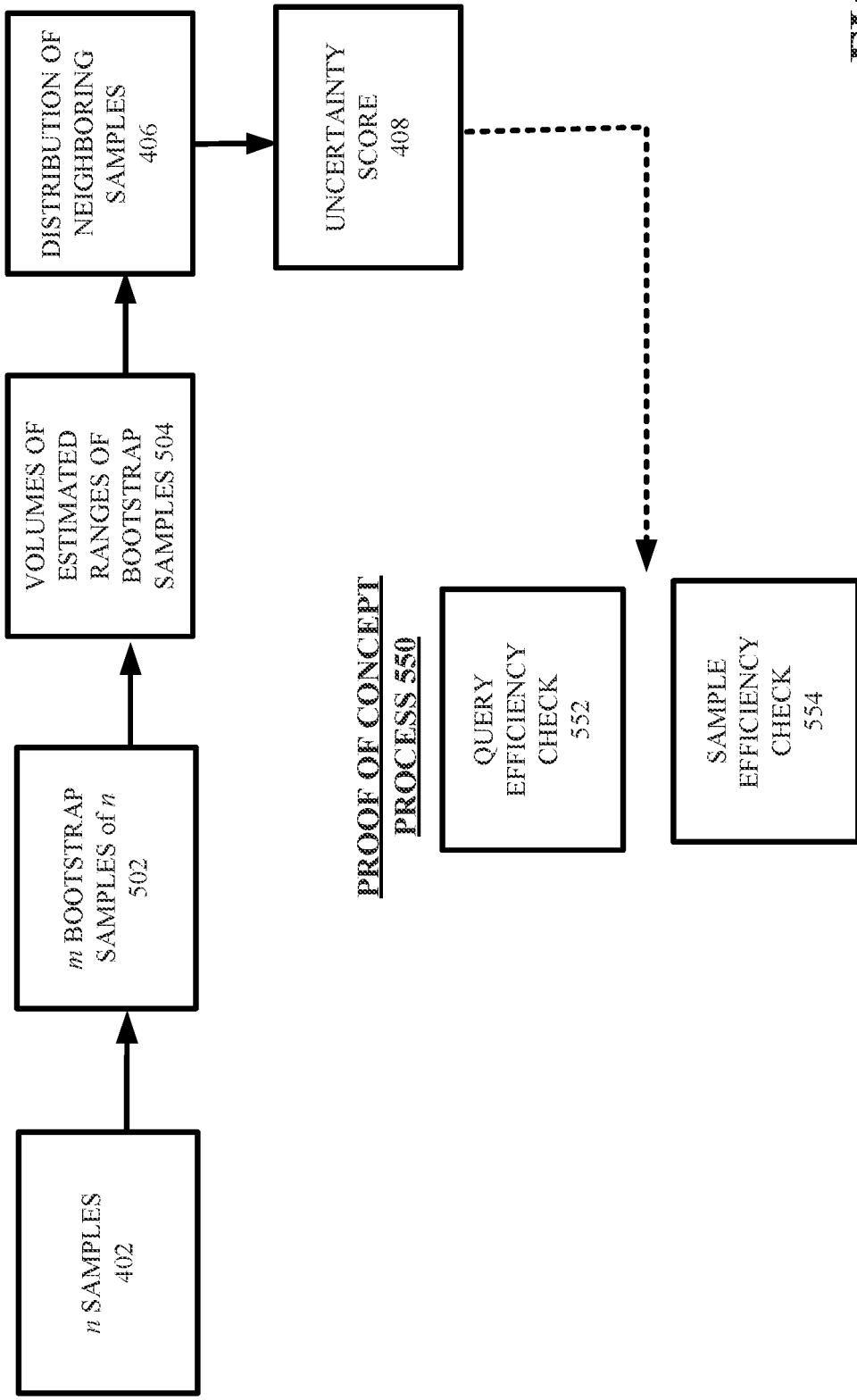
FIG. 5 illustrates a flow diagram of a set of operations performed by the non-limiting system of FIG. 2, in accordance with one or more embodiments described herein.

Turning briefly to FIG. 5, an uncertainty estimation process 500 can comprise identifying n samples 402 of the $Q_1$ subset of the distribution of samples. The uncertainty α can be based on n because error of an MPSR can be defined in terms of n. For example, the error of an MPLSE can be determine in terms on n, which error can scale as $$\frac{1}{\sqrt{n}},$$

with $$\alpha \propto \frac{1}{\sqrt{n}}.$$

Next, at step 502, m bootstrap samples of n can be identified (e.g., by the uncertainty component 216), with corresponding estimated ranges being an $|a_n^{(1)}, b_n^{(1)}|, \ldots, |a_n^{(m)}, b_n^{(m)}|$ with respective volumes of these estimated ranges being $\vartheta_1, \ldots, \vartheta_m|$, and with the volumes being determined at step 504. As used herein, bootstrapping is a method of sampling a dataset with replacement. At step 406, the distribution area of neighboring samples (e.g., the distribution of samples represented by the region $|a_n, b_n|$ can be generally evaluated based on Equation 1 for uncertainty α, where α is set as (1-ρ) and $\vartheta_\cap$ is the volume of the intersection of the sets $\vartheta_1, \ldots, \vartheta_m$.

$$\rho = \frac{\vartheta_\cap}{\min\{\vartheta_1, \ldots, \vartheta_m\}}. \quad \text{Equation 1}$$

Based on ρ, the uncertainty score 408 can be determined for the region $|a_n, b_n|$.

As a result, where α=0, there is a high confidence that the relevant neighbors for a selected input μ lie within the region $|a_n, b_n|$. Alternatively, where α=1, there is a low confidence that the relevant neighbors for a selected input µ lie within the region $|a_n, b_n|$. Between $\alpha=0$ and $\alpha=1$ lies a range of confidence levels.

In accordance with the result for the uncertainty $\alpha$, the uncertainty component 216 can determine whether the uncertainty score indicates a confidence (or not) in the distribution of samples represented by the region $|a_n, b_n|$. This determination can employ one or more thresholds, which can be defaulted, determined by the analytical model explanation system 202, such as based on historical data, and/or set by an administrating entity to the analytical model explanation system 202.

The sampling component 218 can, based on the uncertainty score 408 and at least partially on N-n examples 412 from Equation 2, identify a subset $Q_2$ of the distribution of samples of the region $|a_n, b_n|$.

$$\mathcal{N}\left(\alpha\mu + (1-\alpha)\frac{a_n + b_n}{2}, \sigma^2 I\right). \qquad \text{Equation 2}$$

For example, the sampling component 218 can employ a set of N-n samples of the distribution of samples $|a_n, b_n|$ to make a determination as to whether the uncertainty score 408 indicates non-confidence satisfying a non-confidence threshold.

Figure 6:
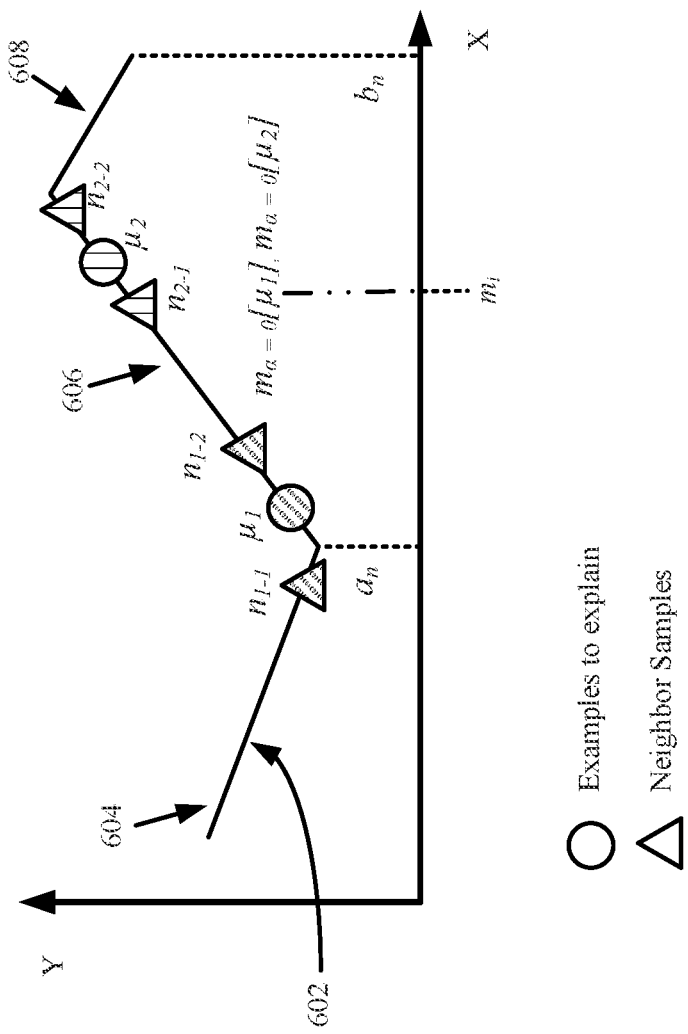
FIG. 6 illustrates an adaptive neighborhood sampling graph relative to one or more operations performed by the non-limiting system of FIG. 2, in accordance with one or more embodiments described herein.

For an illustrated example, turning first to FIG. 6, where ($\alpha=0$) for $\mu_1$, a sampling distribution mean $m_{\alpha=0}[\mu_1]$ can generally be disposed at $m_i$. Likewise, where ($\alpha=0$) for $\mu_2$, a sampling distribution mean $m_{\alpha=0}[\mu_2]$ can generally be disposed at $m_i$. That is, the subset $Q_2$ can be based on an original sampling distribution mean $m_i$ (where i=ideal) of the distribution of samples $|a_n, b_n|$ where the uncertainty score indicates very high confidence.

Figure 7:
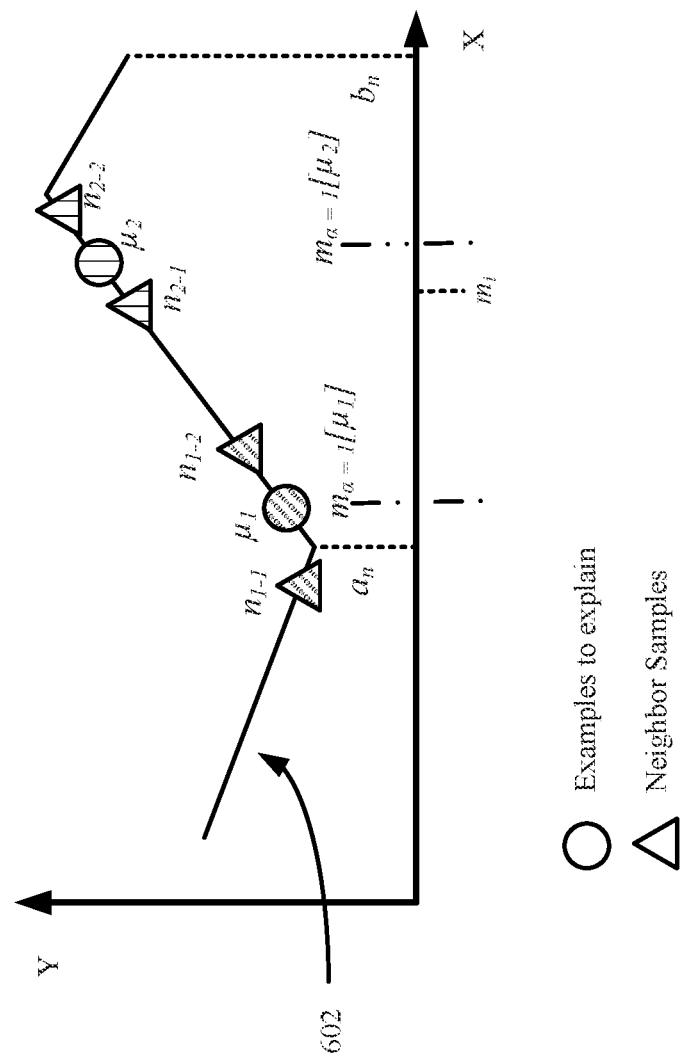
FIG. 7 illustrates another an adaptive neighborhood sampling graph relative to one or more operations performed by the non-limiting system of FIG. 2, in accordance with one or more embodiments described herein.

Turning next to FIG. 7, where ($\alpha=1$) for $\mu_1$, a sampling distribution mean $m_{\alpha=1}[\mu_1]$ can generally be disposed at, and/or substantially close to, a position along the X-axis of $\mu_1$. Likewise, where ($\alpha=1$) for $\mu_2$, a sampling distribution mean $m_{\alpha=1}[\mu_2]$ can generally be disposed at, and/or substantially close to, a position along the X-axis of $\mu_2$. That is, the subset $Q_2$ can be based on a moved sampling distribution mean generally centered at the selected input 228 where the uncertainty score (e.g., 408) indicates very low confidence. It is noted that the movement of a sampling distribution mean m can refer to movement along a respective x-axis of an adaptive neighborhood sampling graph of the analytical model 230.

Alternatively, where the uncertainty score is 1 or about 1, instead, the identification component 214 can identify a larger sample size $n_{rev}$.

Where the uncertainty score is between 0 and 1, thus indicating a confidence level between very high confidence (0) and very low confidence (1), the sampling component 218 can employ a modified sampling distribution mean, e.g., between the original sampling distribution mean and a sampling distribution mean centered at the selected input 228.

It is noted that one or more thresholds can be employed to determine whether to use the original sampling distribution mean for identifying subset $Q_2$, move the sampling distribution mean to the selected input for identifying subset $Q_2$, return to the identification component 214 for selecting a larger sample size $n_{rev}$, and/or move the sampling distribution mean between the original sampling mean and a sampling mean distribution mean centered at the selected input 228 for identifying subset $Q_2$. The one or more thresholds, which can be defaulted, determined by the analytical model explanation system 202, such as based on historical data, and/or set by an administrating entity to the analytical model explanation system 202. These one or more thresholds can be the same as or different from the thresholds employed above by the uncertainty component 216 to determine whether the uncertainty score indicates a confidence (or not) in the distribution of samples represented by the region $|a_n, b_n|$.

Based on the subset $Q_2$, the proxy component 220 can apply (e.g., fit) a regression model to the subset $Q_2$ to generate a proxy model l(•) which can be a local estimation model for estimating a local piece of the analytical model f(•) for the selected input 228 (e.g., µ). This proxy model l(•) can be interpretable and in one or more embodiments, can be a linear model. For example, a lasso can be employed to generate the proxy model l(•) being a linear model. Using one or more of the samples of the subset $Q_2$ as queries to the proxy model l(•), the proxy component 220 can output a proxy output comprising top k coefficients of l(•), where k is a numerical parameter supplied by a user entity of the analytical model explanation system 202 to indicate how many features are desired to be provided in the explanation 280. Where k is larger, the complexity of the explanation can be larger. This proxy output can be employed by the explanation component 222 to determine one or more explanations 280 for how the analytical model output 232 from the analytical model 230 relates to (e.g., is explained by) the selected input 228.

The explanation component 222 can generate an explanation 280 that can relate the analytical model output 232 to the selected input 228, such as explaining one or more aspects of the selected input 228 based on one or more aspects of the analytical model output 232. Generally, the output of the explanation 280 can be based on use of a sample from the subset (e.g., $414/Q_2$) of the distribution of samples (e.g., 406/region $|a_n, b_n|$). That is, one or more samples from the subset can be employed to generate a proxy model (e.g., 416/l(•)) that can then be queried to provide one or more proxy outputs (e.g., 418/k coefficients of l(•)), which proxy outputs can be employed by the explanation component 222 to generate the explanation 280.

For example, consider that proxy outputs 418 are the k coefficients of features such as income level (high/low values) and homeownership of a user entity data point for a credit approval application. Now consider that the k coefficients only pick up income (e.g., 0.3 for high income) and homeownership (e.g., 0.5 for homeownership). A resultant explanation 280 can be that since the user entity corresponding to the data point has high income and owns a home, a probability of getting approved for a loan is high (0.8).

The illustration component 224 can generally generate an image to illustrate the explanation 280 for a user entity of the analytical model explanation system 202. For example, the illustration component 224 can transmit the image to a computer device associated with the user entity by any suitable means (e.g., cloud, internet, local area network and/or wide area network). In one or more embodiments, the computer device can comprise a screen and/or other graphical user interface. Relative to the aforementioned healthcare domain example, the image can comprise a graph or table relating one or more aspects of the selected input 228 to one or more aspects of the analytical model output 232. In one or more embodiments, one or more alternative sets of inputs and outputs to the analytical model 230 can be provided and/or also illustrated for comparison.

In one or more embodiments, the analytical model explanation system 202 can employ the proxy component 220 (and/or any other suitable component and/or processor 206) to perform a proof-of-concept process 550. This proof-of-concept process 550 (FIG. 5) can comprise a query efficiency check 552 and/or a sample efficiency check 554. As indicated above, query efficiency can refer to use of only a number of samples necessary, and thus querying an analytical model with only those samples necessary. That is, a high query efficiency can correspond to lower monetary cost, inference time, power consumption and/or network latency used and/or caused due to such querying. Also as indicated above, sample efficiency can refer to a measure of the usefulness of a sampling strategy. That is, a more efficient sampling strategy can be implemented with fewer simulations and less computational time to reach a certain level of accuracy.

For example, the analytical model explanation system 202 can employ Equation 3 to determine a query efficiency $q_E$ of the proxy model 416/l(•).

$P(x \in [a, b])$ is the probability that the sample generated from the original normal distribution $\mathcal{N}(\mu, \sigma^2 I)$ belongs to the range [a, b]. Similarly, $P_\alpha(x \in [a, b])$ is the probability that the sample generated from the proposed distribution $$\mathcal{N}\left(\alpha\mu + (1-\alpha)\frac{a_n + b_n}{2}, \sigma^2 I\right)$$

belongs to the range [a, b]. x is an arbitrary point used in the expression.

$$q_E = \frac{n}{N} + \frac{N-n}{N} \frac{P_\alpha(x \in [a, b])}{P_\alpha(x \in [a_n, b_n])P(x \in [a, b])}. \quad \text{Equation 3}$$

The analytical model explanation system 202 can employ Equation 4 to determine a sample efficiency $S_E$ of the proxy model 416/l(•).

$$s_E = \frac{n}{N} + \frac{N-n}{N} \frac{P(x \in [a, b])}{P_\alpha(x \in [a, b])}. \quad \text{Equation 4}$$

Further, one or more additional processes can be performed, such as by the proxy component 220 and/or another component of the analytical model explanation system 202, such as to quality stability and/or faithfulness of the proxy model l(•).

For example, high stability can correspond to low variation in infidelity and low coefficient inconsistency. As used herein infidelity can refer to a mean absolute error (MAE) between an explanation and an analytical model over the sample set employed to determine the explanation. That is, infidelity can refer to how far the predictions of the proxy model are from the predictions of the analytical model. An example equation for infidelity is provided below at Equation 5, where (x, y) denote examples in a test set $D_t$, $y_b(x)$ is the analytical model's prediction on an input x and $y_e^{x'}(x)$ refers to the prediction on x applying the proxy model l(•) at x'. Also, $c_e^x$ and $N_x$ denote the feature attributions and test/real neighborhood of x with $|\cdot|_{card}$ denoting cardinality. Attributions can refer to explanations or feature importances obtained from the proxy model l(•).

$$INFD = \frac{1}{|D_t|_{card}} \sum_{(x,y) \in D_t} |y_b(x) - y_e^x(x)|. \quad \text{Equation 5}$$

Figure 8:
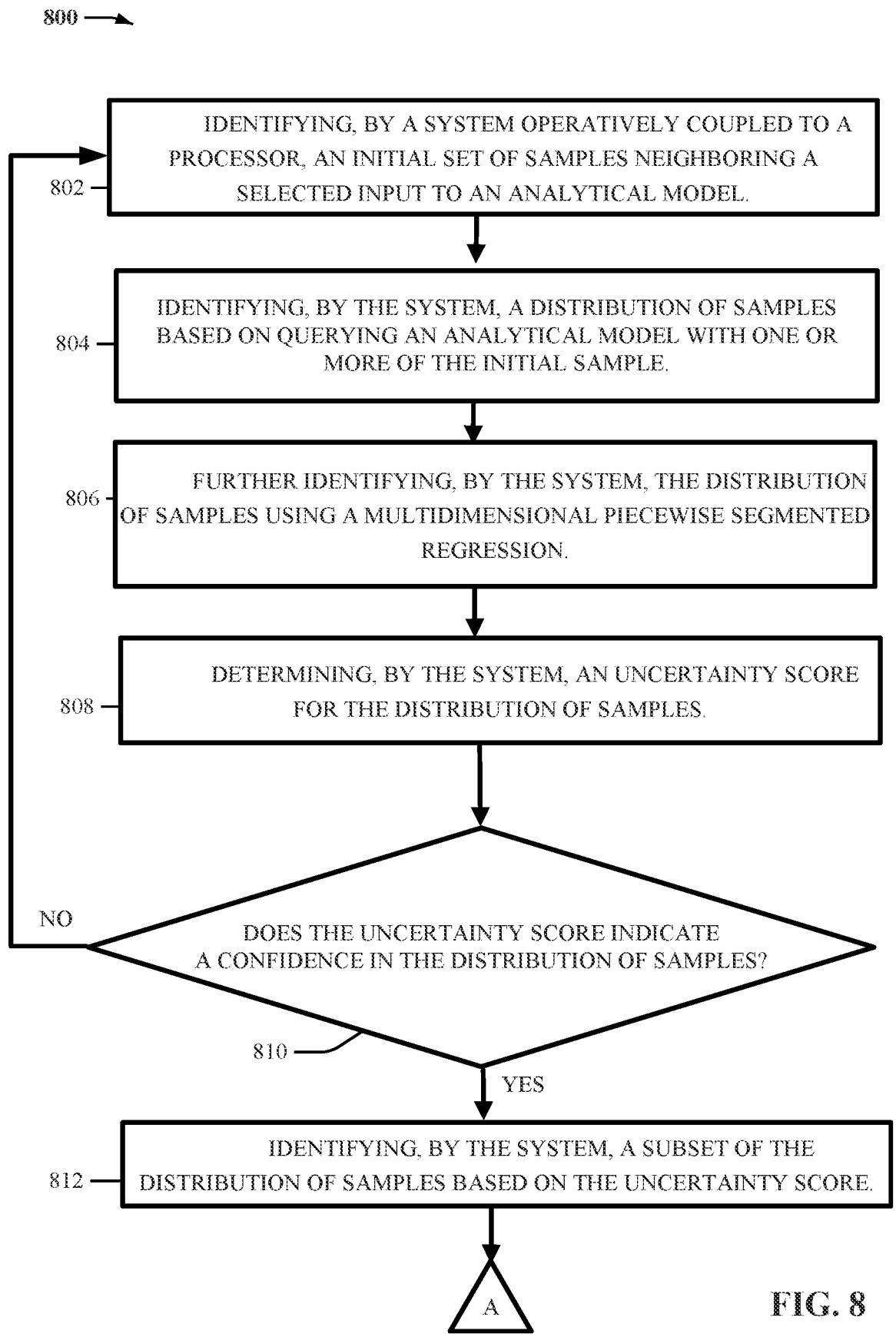
FIG. 8 illustrates a flow diagram of one or more processes that can be performed by the non-limiting system of FIG. 2, in accordance with one or more embodiments described herein.
Figure 9:
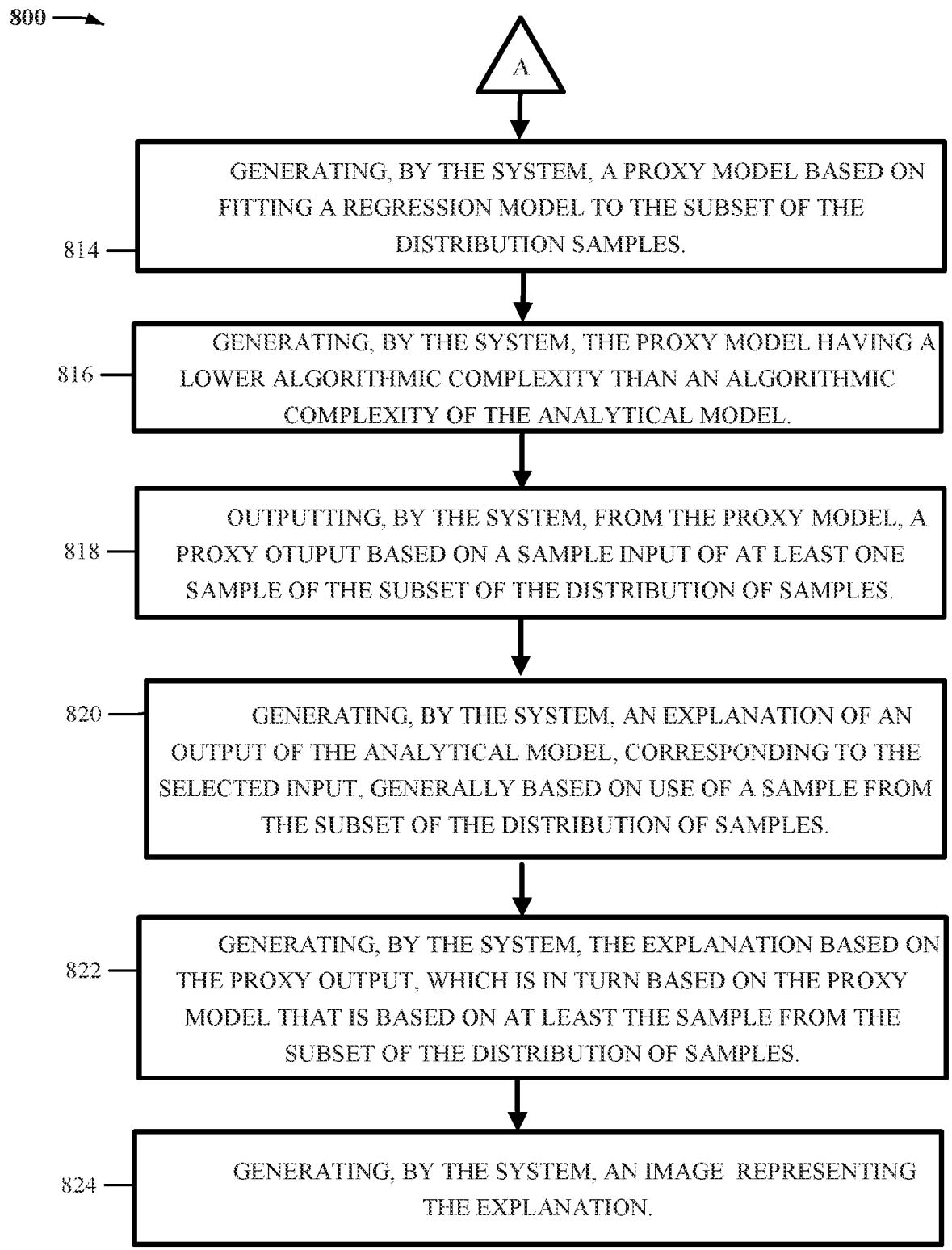
FIG. 9 illustrates a continuation of the flow diagram of FIG. 8 of one or more processes that can be performed by the non-limiting system of FIG. 2, in accordance with one or more embodiments described herein.

Referring next to FIGS. 8 and 9, illustrated is a flow diagram of an example, non-limiting method 800 that can provide a process for providing an explanation result for an analytical model, in accordance with one or more embodiments described herein, such as the non-limiting system 200 of FIG. 2. It is noted that FIG. 9 continues from FIG. 8 with connector A connecting steps 812 and 814. While the non-limiting method 800 is described relative to the non-limiting system 200 of FIG. 2, the non-limiting method 800 can be applicable also to other systems described herein, such as the non-limiting system 100 of FIG. 1. Repetitive description of like elements and/or processes employed in respective embodiments is omitted for sake of brevity.

At 802, the non-limiting method 800 can comprise identifying, by a system operatively coupled to a processor (e.g., identification component 214), an initial set of samples neighboring a selected input to an analytical model (e.g., analytical model 230).

At 804, the non-limiting method 800 can comprise identifying, by the system (e.g., identification component 214) a distribution of samples based on querying an analytical model with one or more of the initial samples.

At 806, the non-limiting method 800 can comprise further identifying, by the system (e.g., identification component 214), the distribution of samples using a multidimensional piecewise segmented regression. In one or more embodiments, the multidimensional piecewise segmented regression can be a multidimensional piecewise linear segmented regression or a multidimensional piecewise polynomial segmented regression.

At 808, the non-limiting method 800 can comprise determining, by the system (e.g., uncertainty component 216), an uncertainty score for the distribution of samples.

At 810, the non-limiting method 800 can comprise determining, by the system (e.g., uncertainty component 216), whether the uncertainty score indicates a confidence in the distribution of samples. If the answer is yes, the non-limiting method 800 can proceed to step 812. If the answer is no, the non-limiting method can proceed back to step 802 for additional identification of a second initial set of samples neighboring the selected input, wherein the second initial set of samples can be larger than the (first) initial set of samples.

At 812, the non-limiting method 800 can comprise identifying, by the system (e.g., sampling component 218), a subset of the distribution of samples based on the uncertainty score.

At 814, the non-limiting method 800 can comprise generating, by the system (e.g., proxy component 220), a proxy model based on fitting a regression model to the subset of the distribution samples. In one or more embodiments, the regression model can comprise a lasso.

At 816, the non-limiting method 800 can comprise generating, by the system (e.g., proxy component 220), the proxy model having a lower algorithmic complexity than an algorithmic complexity of the analytical model.

At 818, the non-limiting method 800 can comprise outputting, by the system (e.g., proxy component 220), from the proxy model, a proxy output based on a sample input of at least one sample of the subset of the distribution of samples.

At 820, the non-limiting method 800 can comprise generating, by the system (e.g., explanation component 222), an explanation of an output of the analytical model, corresponding to the selected input, generally based on use of a sample from the subset of the distribution of samples.

At 822, the non-limiting method 800 can comprise more particularly, generating, by the system (e.g., explanation component 222), the explanation based on the proxy output, which is in turn based on the proxy model that is based on at least the sample from the subset of the distribution of the samples.

At 824, the non-limiting method 800 can comprise illustrating, by the system (e.g., illustration component 224), the explanation based on the proxy output, which is in turn based on the proxy model that is based on at least the sample from the subset of the distribution of the samples.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, devices, computer program products and/or computer-implemented methods of use provided herein relate to a process for providing an explanation result for an analytical model. A system can comprise a memory that stores computer executable components, and a processor that executes the computer executable components stored in the memory, wherein the computer executable components can comprise an uncertainty component that determines an uncertainty score for a distribution of samples that neighbor a selected input to an analytical model, a sampling component that identifies a subset of the distribution of samples based on the uncertainty score, and an explanation component that generates an explanation of an output of the analytical model, corresponding to the selected input, based on use of a sample from the subset of the distribution of samples.

An advantage of the above-indicated system, method and/or computer program product can be obtaining reliable post-hoc explanations to allow for relatability of an output of an analytical model to one or more aspects of a selected input to the analytical model to which the output corresponds. The explanations can be reliable because they can closely correspond to behavior of the analytical model. Additionally, and/or alternatively, the explanations can be reliable because varying distribution sample sizes (e.g., widths/radiuses) about a selected input can result in low variation in such explanations.

Another advantage of the above-indicated system, method and/or computer program product can be imbibing trust in such analytical model based on a reliable post-hoc explanation for an output of the analytical model. Such advantage can be relative to a plurality of domains where analytical models are often employed, such as, but not limited to finance (e.g., credit approval), health care (e.g., medical treatment decisions and/or medical diagnoses), criminal justice (e.g., criminal risk assessment), and/or agriculture (e.g., predicting crop yield and/or nutrient input).

In one or more embodiments of the aforementioned system, method and/or computer program product, such system, method and/or computer program product can be agnostic relative to type and/or complexity of analytical model being evaluated. That is, varying degrees of complexity of analytical models can be evaluated by the one or more embodiments disclosed herein with similar results. Varying types of analytical models (e.g., artificial intelligence, deep learning, machine learning, etc.) can be evaluated by the one or more embodiments disclosed herein with similar results.

Indeed, in view of the one or more embodiments described herein, a practical application of the one or more systems, computer-implemented methods and/or computer program products described herein can be ability to accurately and precisely provide an explanation for an output of an analytical model, based on the corresponding selected input to the analytical model, without access to the inner workings of the analytical model. This can be at least partially due to an ability to estimate an uncertainty score for a determined distribution of samples about the selected input. Such is a useful and practical application of computers, thus providing enhanced (e.g., improved and/or optimized) querying and/or sampling operations for an analytical model and/or for generation of a local model for interpreting a local piece of such analytical model. Overall, such computerized tools can constitute a concrete and tangible technical improvement in the field of analytical models.

Moreover, a device and/or method described herein can be scalable, such as where plural selected inputs to one or more analytical models can be evaluated at least partially in parallel with one another. Likewise, plural different distribution samples (e.g., about one or more selected inputs) can be evaluated at least partially in parallel with one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to explaining results of analytical models (e.g., analyzing and/or evaluating such results), as compared to existing systems and/or techniques. Systems, computer-implemented methods and/or computer program products providing performance of these processes are of great utility in the field of analytical model use, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively automatically provide an explanation for an output of an analytical model, based on the corresponding selected input to the analytical model, without access to the inner workings of the analytical model, as the one or more embodiments described herein can provide this process. Moreover, neither can the human mind nor a human with pen and paper conduct one or more of these processes, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

Figure 10:
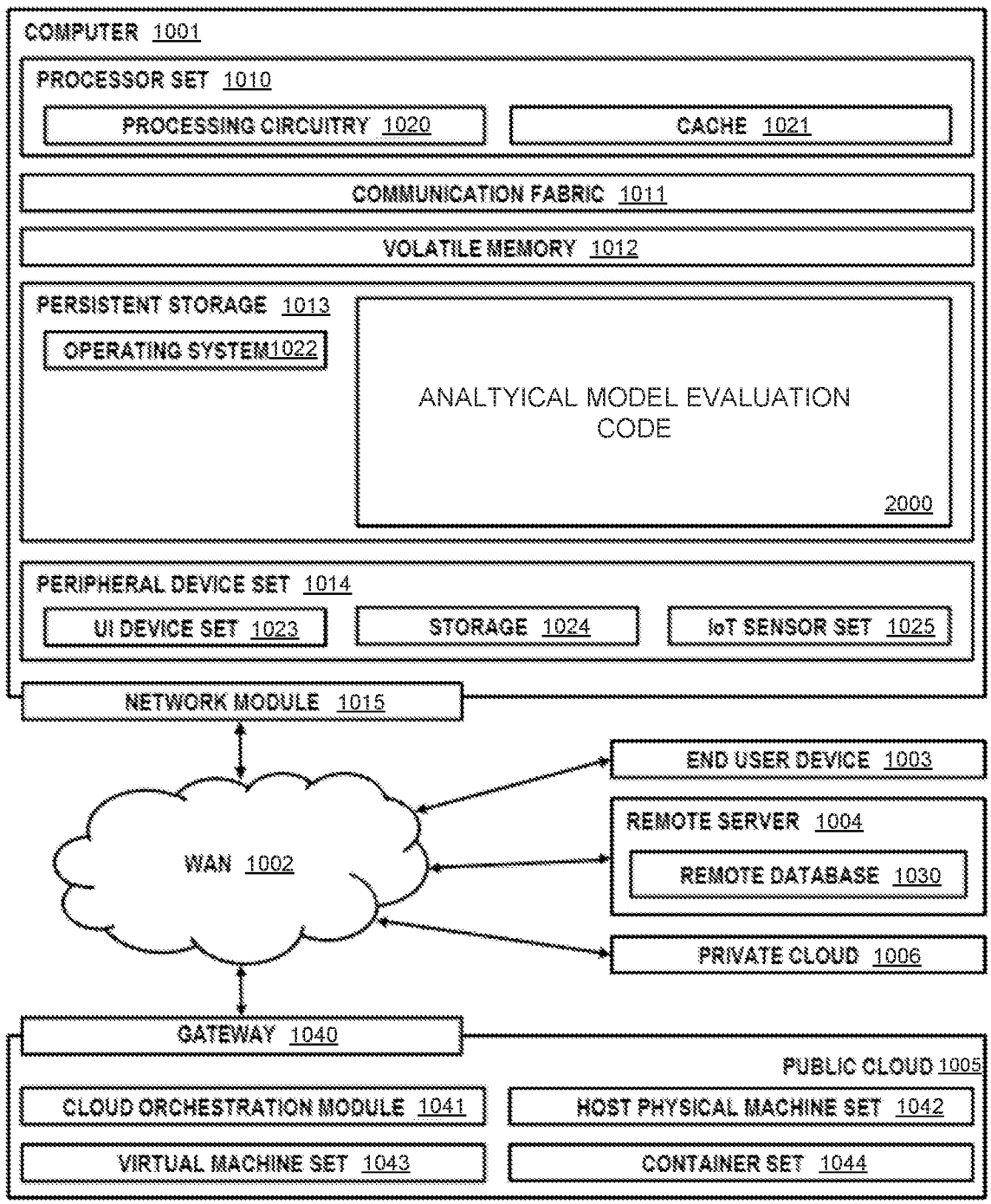
FIG. 10 illustrates a block diagram of example, non-limiting, computer environment in accordance with one or more embodiments described herein.

Turning next to FIG. 10, a detailed description is provided of additional context for the one or more embodiments described herein at FIGS. 1-9.

FIG. 10 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as translation of an original source code based on a configuration of a target system by the analytical model evaluation code 2000. In addition to block 2000, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 2000, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 2000 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid-state storage devices. Operating system 1022 may take several forms, such as various known proprietary operating systems or open-source Portable Operating System Interface type operating systems that employ a kernel. The code included in block 2000 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine that collects and stores helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

The invention claimed is:

1. A system, comprising:
a memory that stores computer executable components; and
a processor that executes at least one of the computer executable components that
iteratively, until an uncertainty score for a distribution of samples satisfies a defined confidence threshold and the distribution of samples fall on a straight line extending from a selected input:
selects, based on a defined selection process, a set of inputs from a set of samples neighboring the selected input, wherein the set of samples neighboring the selected input are scattered in a non-linear region surrounding the selected input,
generates, using an analytical model, a set of outputs based on the set of inputs,
determines the distribution of samples based on the set of outputs, and
determines the uncertainty score for the distribution of samples, wherein the uncertainty score indicates a level of confidence that relevant neighbor samples for the selected input are within the distribution of samples;

identifies a subset of the distribution of samples based on the uncertainty score; and generates an explanation of an output of the analytical model generated using the selected input, based on use of a sample from the subset of the distribution of samples.

2. The system of claim 1, wherein the distribution of samples define local boundaries of a neighborhood surrounding the selected input.

3. The system of claim 1, wherein the determining the distribution of samples employs a multidimensional piecewise segmented regression.

4. The system of claim 1, wherein the at least one of the computer executable components further:

generates a proxy model based on fitting a regression model to the subset of the distribution of samples.

5. The system of claim 4, wherein the proxy model has a first algorithmic complexity that is lesser than a second algorithmic complexity of the analytical model.

6. The system of claim 4, wherein the at least one of the computer executable components further:

outputs from the proxy model a proxy output based on a sample input of at least one sample of the subset of the distribution of samples, and wherein the explanation is generated based on the proxy output.

7. The system of claim 1, wherein the system is analytical model agnostic.

8. The system of claim 1, wherein the at least one of the computer executable components further:

generates an image representing the explanation.

9. A computer-implemented method, comprising:

iteratively, until an uncertainty score for a distribution of samples satisfies a defined confidence threshold and the distribution of samples fall on a straight line extending from a selected input:

selecting, by a system operatively coupled to a processor, based on a defined selection process, a set of inputs from a set of samples neighboring the selected input, wherein the set of samples neighboring the selected input are scattered in a non-linear region surrounding the selected input, generating, by the system, using an analytical model, a set of outputs based on the set of inputs, determining, by the system, the distribution of samples based on the set of outputs, and determining, by the system, the uncertainty score for the distribution of samples, wherein the uncertainty score indicates a level of confidence that relevant neighbor samples for the selected input are within the distribution of samples;

identifying, by the system, a subset of the distribution of samples based on the uncertainty score; and generating, by the system, an explanation of an output of the analytical model, generated using the selected input, based on use of a sample from the subset of the distribution of samples.

10. The computer-implemented method of claim 9, wherein the distribution of samples define local boundaries of a neighborhood surrounding the selected input.

11. The computer-implemented method of claim 9, wherein the determining the distribution of samples employs a multidimensional piecewise segmented regression.

12. The computer-implemented method of claim 11, wherein the multidimensional piecewise segmented regression comprises a multidimensional piecewise linear segmented regression or a multidimensional piecewise polynomial segmented regression.

13. The computer-implemented method of claim 9, further comprising:

generating, by the system, a proxy model based on fitting a regression model to the subset of the distribution of samples.

14. The computer-implemented method of claim 13, further comprising:

outputting, by the system, from the proxy model a proxy output based on a sample input of at least one sample of the subset of the distribution of samples, and wherein the explanation is generated based on the proxy output.

15. A computer program product facilitating a process for providing an explanation result for an analytical model, the computer program product comprising a non-transitory computer readable medium having program instructions embodied therewith, the program instructions executable by a processor to cause the processor to:

iteratively, until an uncertainty score for a distribution of samples satisfies a defined confidence threshold and the distribution of samples fall on a straight line extending from a selected input:

select, based on a defined selection process, a set of inputs from a set of samples neighboring the selected input, wherein the set of samples neighboring the selected input are scattered in a non-linear region surrounding the selected input, generate, using the analytical model, a set of outputs based on the set of inputs, determine the distribution of samples based on the set of outputs, and determine the uncertainty score for the distribution of samples, wherein the uncertainty score indicates a level of confidence that relevant neighbor samples for the selected input are within the distribution of samples;

identify a subset of the distribution of samples based on the uncertainty score; and generate an explanation of an output of the analytical model generated using the selected input, based on use of a sample from the subset of the distribution of samples.

16. The computer program product of claim 15, wherein the distribution of samples define local boundaries of a neighborhood surrounding the selected input.

17. The computer program product of claim 16, wherein the determining the distribution of samples employs a multidimensional piecewise segmented regression.

18. The computer program product of claim 17, wherein the multidimensional piecewise segmented regression comprises a multidimensional piecewise linear segmented regression or a multidimensional piecewise polynomial segmented regression.

19. The computer program product of claim 15, wherein the program instructions are further executable by the processor to cause the processor to:

generate, by the processor, a proxy model based on fitting a regression model to the subset of the distribution of samples.

20. The computer program product of claim 19, wherein the program instructions are further executable by the processor to cause the processor to:

output, by the processor, from the proxy model a proxy output based on a sample input of at least one sample of the subset of the distribution of samples, and wherein the explanation is generated based on the proxy output.

* * * * *